United States Patent [19]

Mathias

[11] 4,003,453
[45] Jan. 18, 1977

[54] SLIDING CALIPER DISC BRAKE
[75] Inventor: Christopher Neil Mathias, Henley-in-Arden, England
[73] Assignee: Girling Limited, Birmingham, England
[22] Filed: June 11, 1975
[21] Appl. No.: 586,021
[30] Foreign Application Priority Data
June 19, 1974 United Kingdom ............ 27086/74
[52] U.S. Cl. .............................. 188/72.4; 188/73.6
[51] Int. Cl.² ...................................... F16D 55/18
[58] Field of Search .......... 188/106 P, 72.5, 264 R, 188/71.6, 73.6, 206 R, 205 R, 73.3, 73.4, 73.5, 72.1, 72.4, 71.1

[56] References Cited
UNITED STATES PATENTS

| | | | |
|---|---|---|---|
| 3,387,687 | 6/1968 | Eggstein et al. | 188/73.3 X |
| 3,470,984 | 10/1969 | Goddard | 188/73.3 X |
| 3,500,966 | 3/1970 | Birge | 188/72.4 |
| 3,616,875 | 11/1971 | Lottridge | 188/73.3 |
| 3,656,590 | 4/1972 | Newstead | 188/73.4 |
| 3,889,785 | 6/1975 | Hori | 188/73.3 |

FOREIGN PATENTS OR APPLICATIONS

| | | | |
|---|---|---|---|
| 1,376,725 | 9/1964 | France | 188/73.3 |
| 1,335,552 | 10/1973 | United Kingdom | 188/73.3 |

*Primary Examiner*—Trygve M. Blix
*Assistant Examiner*—Douglas C. Butler
*Attorney, Agent, or Firm*—Scrivener Parker Scrivener and Clarke

[57] ABSTRACT

A vehicle disc brake of the sliding caliper reaction type including a caliper slidably mounted on a carrier wherein the carrier incorporates spaced arms extending axially in a direction away from the plane of the disc and providing spaced parallel guides with which complementary axially extending guides on the caliper co-operate slidably, and a slipper is located between the guides of at least one co-operating pair.

6 Claims, 9 Drawing Figures

FIG.4.

SLIDING CALIPER DISC BRAKE

This invention relates to disc brakes for vehicles, the brakes being of the kind in which friction pad assemblies for engagement with opposite faces of a rotatable disc are located in a caliper which straddles the peripheral edge of the disc and is slidably mounted on a carrier for movement in a direction parallel to the axis of the disc, the caliper incorporating actuating means for applying one of the friction pad assemblies directly to one face of the disc, the other friction pad assembly being applied to the opposite face of the disc by the reaction on the caliper which causes it to move in an axial direction with respect to the carrier.

In one known brake of the kind set forth the caliper is guided between spaced guides in the carrier which extend over the peripheral edge of the disc and the caliper is keyed in position by removable metal slippers which are interposed between the guides and complementary guide surfaces on the caliper, a blade spring being provided for urging the caliper, the slippers, and the guides into respective engagement at all times, and in order to take up tolerances.

In such a known brake the slippers, the guides and the guide surfaces are relatively close to the disc and will be subjected to increased temperatures when the brake is applied. Under certain circumstances such temperatures may be excessive and can cause distortion of the guides, guide surfaces and metal slippers.

According to our invention in a disc brake of the kind set forth for vehicles the carrier incorporates spaced arms extending axially in a direction away from the plane of the disc and providing spaced parallel guides with which complementary axially extending guides on the caliper co-operate slidably, and a slipper is located between the guides of at least one co-operating pair.

The guides are thus located in a cool environment away from the heat generated in the disc when the brake is applied.

As the guides are not subjected to excessive temperatures the slipper may be of a plastics material which is free from risk or corroding or seizing up, and if the material of the slipper has a certain amount of resilient compressability it can be used to take up tolerances and obviate the need for using a spring for that purpose.

A suitable material is nylon.

Conveniently slippers are located between the guides of both co-operating pairs and, preferably the guides are so constructed, arranged and dimensioned that removal of the caliper from the carrier can be accomplished only after removal of both slippers. This has the advantage that should one slipper be dislodged in service, relative movement between the caliper and the carrier will generate a noise indicating a fault, but the presence of the other slipper will prevent the caliper from being completely separate from the carrier.

The caliper and the carrier are both constructed and arranged so that no part thereof encroaches on the guides. This has the advantage that the guides can be machined by a single broaching operation.

In one construction the co-operating guides are of rectangular outline with one guide of each pair comprising a groove which slidably receives the other guide of that pair, and the slippers are of channel section being received within the grooves.

Preferably the carrier provides abutments for taking the drag on the friction pad assemblies when the brake is applied so that the caliper only has the clamping load to deal with and its movement is a purely sliding one.

BRIEF DESCRIPTION OF THE DRAWINGS

Two forms of brake caliper are illustrated by way of example in the accompanying drawings in which.

DETAILED DESCRIPTION

Figure 1:
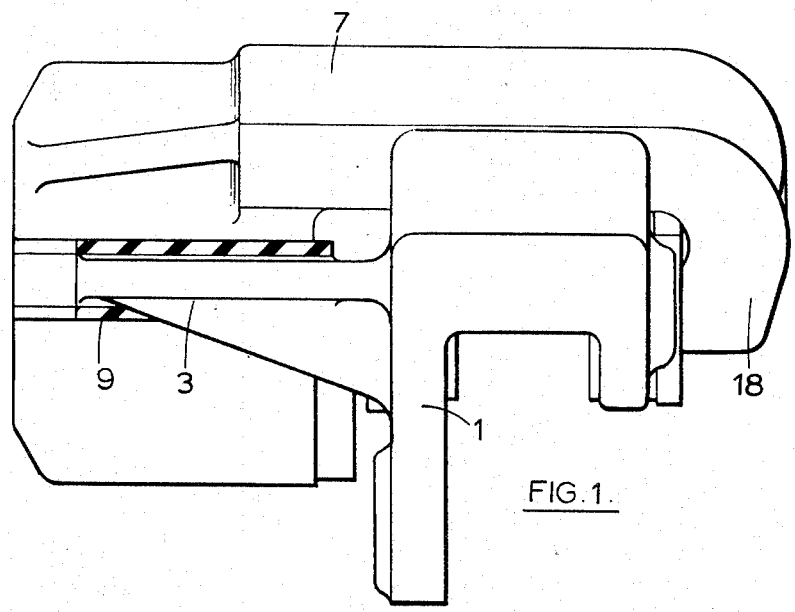
FIG. 1 is a side view of one form.
Figure 2:
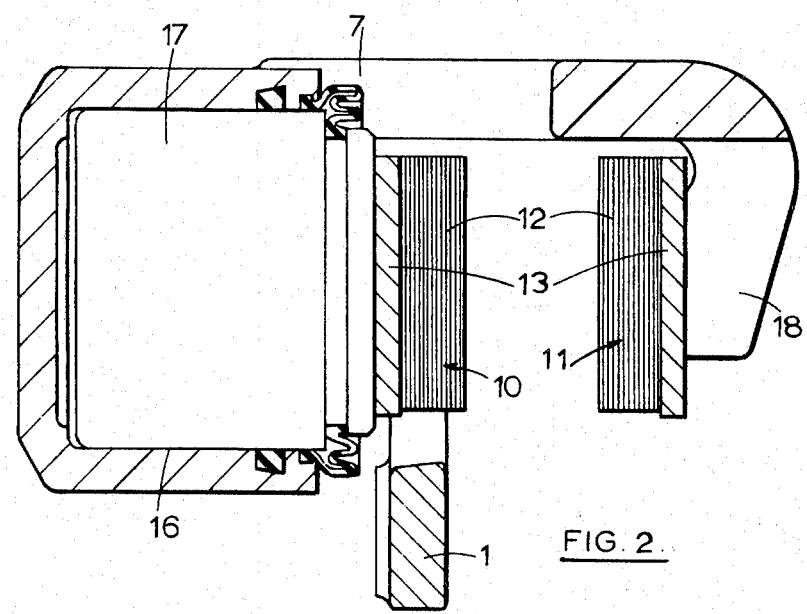
FIG. 2 is a section in a radial plane.

In the disc brake illustrated in FIGS. 1 to 5 of the drawings, 1 is a stationary carrier which is of U-form and fits over the periphery of a rotatable disc (not shown). The carrier 1 is adapted to be secured to a fixed part adjacent to the disc by bolts passing through holes 2.

Spaced arms 3 extend axially from the carrier in a direction away from and on one side only of the disc. The inner edges of the arms 3 terminate in enlargments comprising spaced parallel guides 4 of rectangular cross section comprising parallel side faces 5, and an end face 6 normal to the side faces 6.

A caliper 7 straddling the peripheral end of the disc is provided in each of its sides with a guide comprising a groove 8 of rectangular outline complementary to that of guides 4 which they receive. The grooves 8 have opposed oppositely facing mouths.

Figure 3:
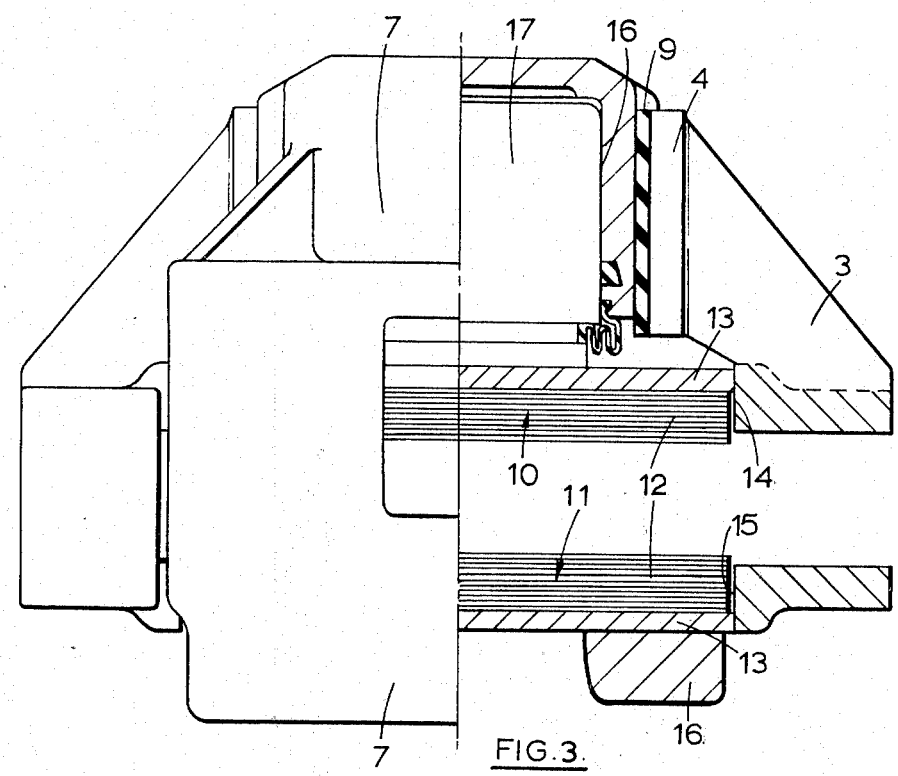
FIG. 3 is a plan with one side in section.
Figure 4:
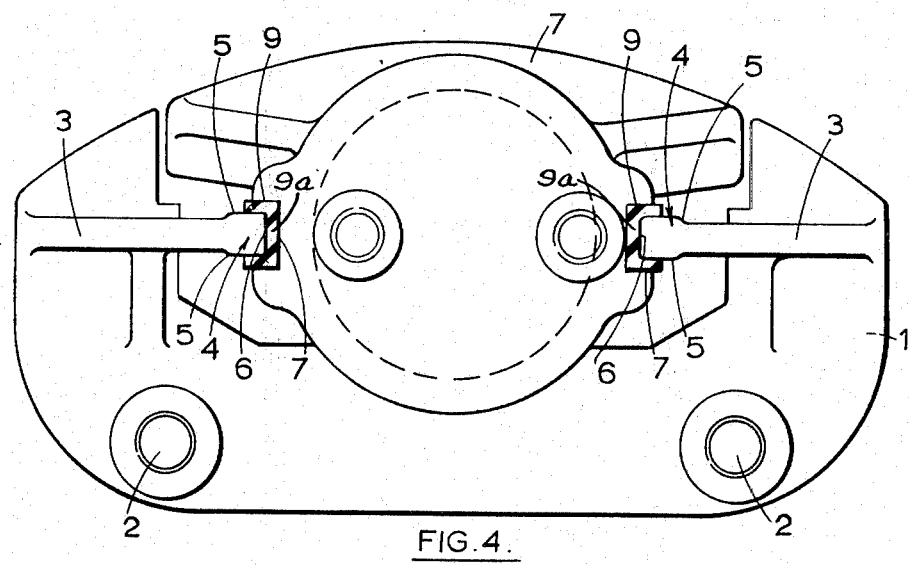
FIG. 4 is an end view.

Slippers 9 made of nylon or other suitable plastics material and of channel cross section as shown more particularly in FIGS. 3 and 4 are interposed in symmetrical gaps 9a between the guide surfaces 5 and 6 and the complementary surfaces of the grooves 8.

The relative dimensions of the guides 4 and 8, and the slippers 9 are such that the caliper 7 is a good sliding fit in the carrier 1 with some resilient compression of the material of the slippers 9 which take up any tolerances. However, the slippers 9 serve to restrain the caliper 7 against movement with respect to the carrier 9 in both radial and circumferential directions without the provision of additional springs or other resilient means.

Figure 5:
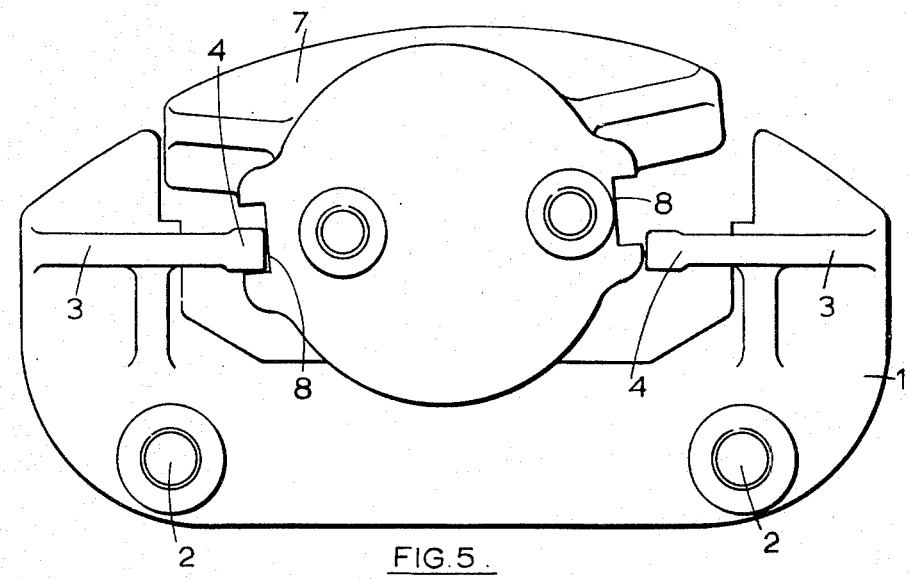
FIG. 5 is a view similar to FIG. 4, showing how the caliper can be removed from the carrier.

The relative dimensions of these parts are also such that when both slippers 9 have been slid axially out of the grooves 8 there is sufficient clearance to allow the caliper 7 to be moved circumferentially towards one of the guides 4 far enough for the other side of the caliper 7 to clear the other guide 4 when the caliper 7 is rocked about the first guide 4, as shown in FIG. 5, so that the caliper 7 can then be lifted out of the carrier 1 in a substantially radial direction. However, removal of the caliper 7 cannot be effected by removal of only one slipper 9, but the relative movement permitted thereby is sufficient to indicate that a fault has occurred.

Spring clips or any other convenient means may be employed for normally holding the slipper against axial movement. For example a split pin may be passed through complementary openings in the guide 4 and the slippers 9.

The guides 4 and 8 are arranged in positions so that they can be machined by simple broaching operations with operation of the broaches being unimpeded by the remainder of the carrier 1 and the caliper 7.

Friction pad assemblies 10 and 11 are located in the caliper 7 and each friction pad assembly comprises a friction pad 12 for engagement with an adjacent face of the disc with the friction pad carried by a rigid backing plate 13. The friction pad assemblies 10, 11 are guided in the carrier 1 for movement towards and away from the disc with the ends of the backing plates 13 engaging slidably with complementary surfaces 14, 15 in the carrier which take the drag on the friction pad assemblies when the brake is applied.

The caliper 7 incorporates an hydraulic cylinder 16 in which works a piston 17 by which the adjacent friction pad 10 is applied directly to the disc. The caliper 7 extends across the plane of the disc and terminates in an inwardly extending abutment 18 which engages and applies the second friction pad assembly 11 to the disc on reaction movement of the caliper 7 sliding axially with respect to the carrier 1 when the cylinder 16 is pressurized.

Figure 6:
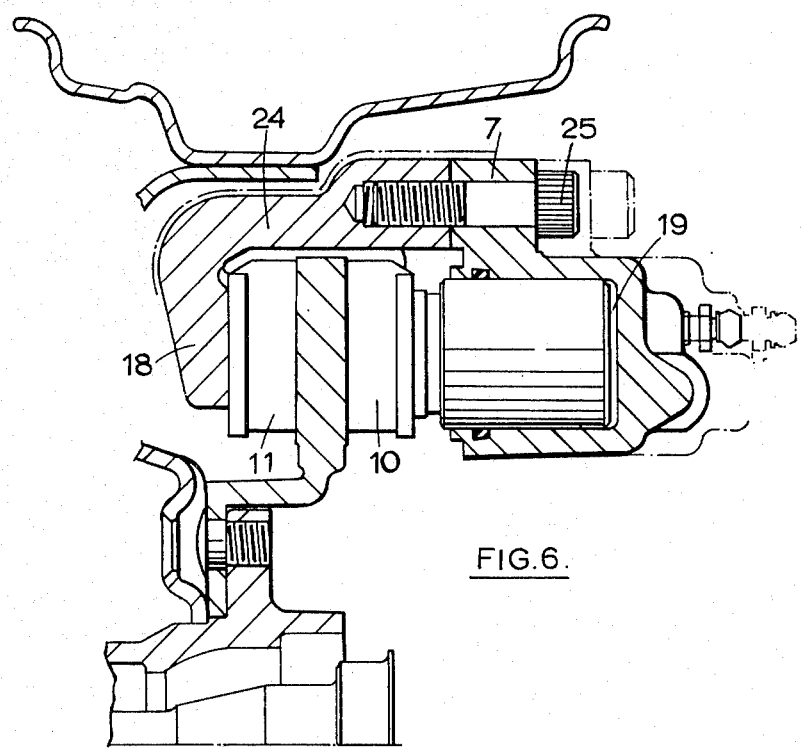
FIG. 6 is a section on the line 6—6 of FIG. 7 of a modified form.
Figure 8:
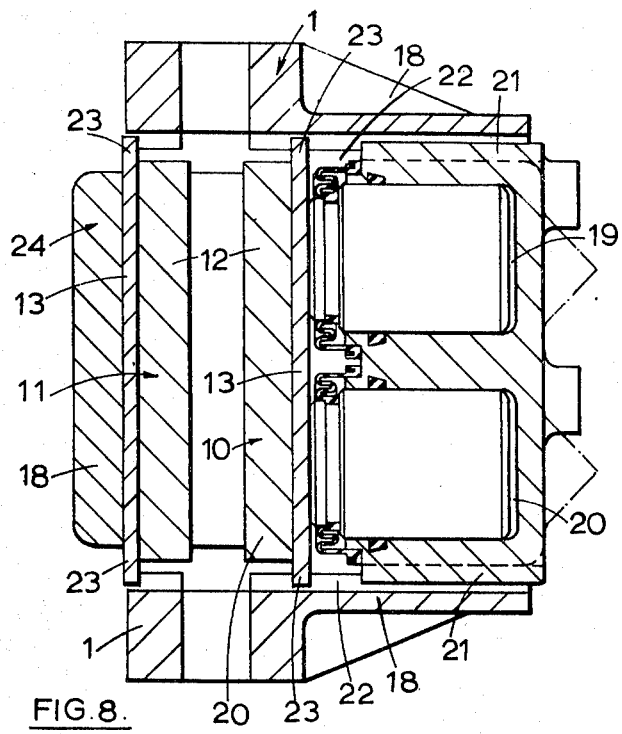
FIG. 8 is a section on the line 8—8 of FIG. 7.
Figure 7:
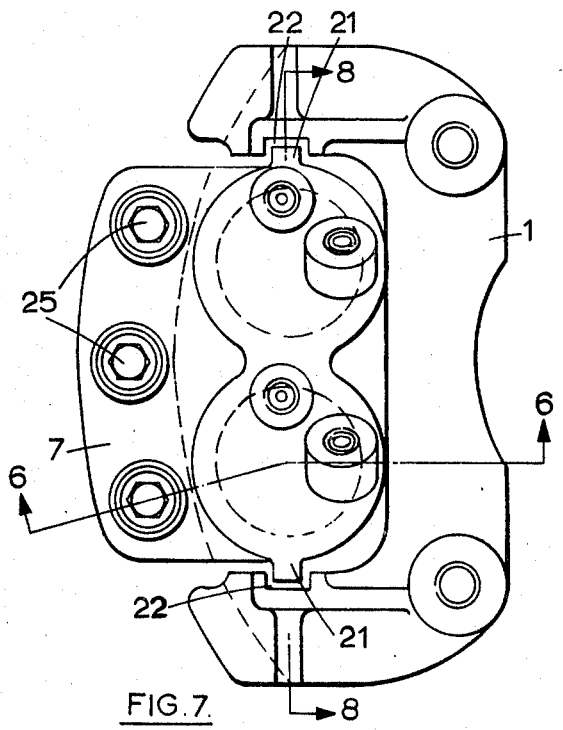
FIG. 7 is an end view of the caliper of FIG. 6.
Figure 9:
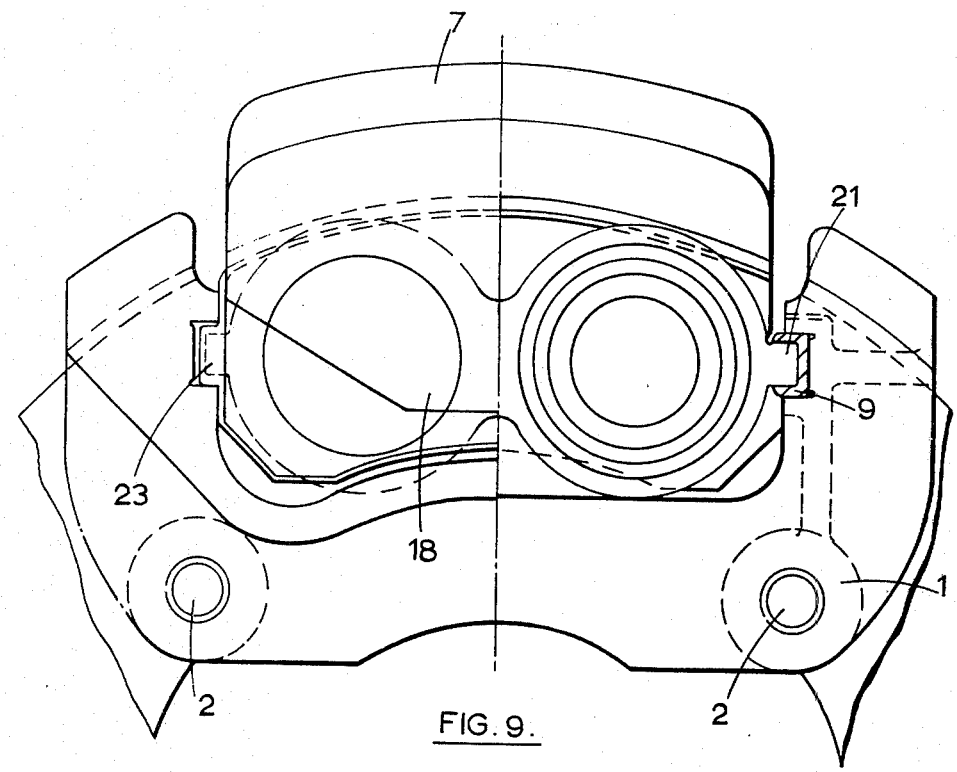
FIG. 9 is an end view partly in section.

In the alternative arrangement shown in FIG. 6 of the drawings the caliper 7 incorporates two hydraulic cylinders 19, 20 side-by-side, and the guides are formed by parallel ribs 21 of rectangular cross-section on opposite sides of the caliper 7 slidably engaged in complementary guides comprising axial grooves 22 in the carrier 1, the slippers 9 of channel cross-section being located in the grooves 22. The grooves 22 extend for the full axial length of the carrier 1 including the axially extending arms 3 and also serve to guide the friction pad assemblies 10, 11 which are formed with laterally projecting lugs 23 engaging in the grooves.

As the guides are of uniform cross-section throughout their lengths they can easily be machined by a broaching or like operation.

The part of the caliper 7 which extends over the disc and incorporates the abutment 18 to apply the second friction pad assembly 11 to the disc may be formed as a separate member 24 which is secured to the main part by bolts 25. This allows the bridge part of the caliper which lies between the brake disc and the wheel, as shown in FIG. 6, and of which the radial thickness is limited by the space available, to be made of any material being the necessary strength.

It will be appreciated that as the caliper takes none of the drag on the friction pads when the brake is applied but has a purely clamping function and the guides for the caliper do not extend over the disc and bridge part of the caliper which extends over the disc can be of relatively small radial dimensions which is an important advantage where the radial clearance between the disc and the wheel rim is limited.

The construction and operation of the disc brake illustrated in FIGS. 6 to 9 is otherwise the same as that of FIGS. 1 to 5 and corresponding reference numerals have been applied to corresponding parts.

I claim:

1. A vehicle disc brake comprising a carrier, a rotatable disc, a caliper straddling a portion of a peripheral edge of said disc and slidably mounted on said carrier for movement in a direction substantially parallel to the axis of said disc, first and second friction pad assemblies for engagement with opposite faces of said disc located in said caliper, actuating means incorporated in said caliper for applying said first friction pad assembly directly to one face of said disc, said second friction pad assembly being applied to the opposite face of said disc by the reaction on said caliper which causes said caliper to move in an axial direction with respect to said carrier, and spaced arms incorporated in said carrier and extending axially in a direction away from said disc, said spaced arms providing a pair of spaced parallel guides, a pair of axially extending guides on said caliper complementary to and co-operating slidably with said guides on said arms, wherein said guides of one of said pairs are constituted by recessed walls defining grooves having opposed open mouths and said guides of the other of said pairs are constituted by tongues for reception in said grooves with gaps defined between said walls and portions of said tongues received within said grooves, dimensions of said gaps at least in a generally circumferential direction being such that an engagement of one of said tongues with said wall of said groove in which it is received is sufficient to provide a clearance between the other of said tongues and said open mouth of that groove to permit said caliper to be removed from said brake, and slippers are removably located in said gaps between said guides of both co-operating pairs to retain said caliper against movement with respect to said carrier in both radial and circumferential directions, said slippers being axially slidable out of said gaps whereafter said caliper can be removed from said brake in a generally radial direction.

2. A disc brake as claimed in claim 1, wherein each said slipper is of plastics material.

3. A disc brake as claimed in claim 1, wherein each said slipper is of a material having an amount of resilient compressibility.

4. A disc brake as claimed in claim 1, wherein said grooves are of rectangular outline, and said slippers are of channel section being received within said gaps which are of complementary channel section.

5. A disc brake as claimed in claim 4, wherein said grooves are provided in sides of the caliper, and enlargements at inner ends of said arms are slidably received within said slippers which are located in said grooves.

6. A disc brake as claimed in claim 4, wherein said grooves are provided in inner ends of said arms, and parallel ribs of complementary outline are slidably received within said slippers which are located in said grooves.

* * * * *